(12) United States Patent
Sengoku et al.

(10) Patent No.: US 7,359,199 B2
(45) Date of Patent: Apr. 15, 2008

(54) PORTABLE ELECTRONIC APPARATUS

(75) Inventors: Eisuke Sengoku, Yokohama (JP); Keiichi Tadokoro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 11/371,256

(22) Filed: Mar. 7, 2006

(65) Prior Publication Data

US 2007/0109747 A1    May 17, 2007

(30) Foreign Application Priority Data

Nov. 14, 2005  (JP) .............................. 2005-328247

(51) Int. Cl.
*H05K 7/20* (2006.01)

(52) U.S. Cl. ...................... 361/704; 361/690; 361/715; 361/719; 165/80.3; 165/104.33; 165/185; 174/16.3; 174/252

(58) Field of Classification Search ........ 361/702–704, 361/707, 711, 714, 720, 687, 816, 818, 679, 361/715, 800, 690; 312/223.2, 223.3; 396/321, 396/374, 431, 542; 165/80.3, 185; 386/38, 386/117, 118, 125; 348/373–376, 335, 340, 348/233, 341, 333; 174/16.3
See application file for complete search history.

(56) References Cited

U.S. PATENT DOCUMENTS

| 4,916,575 | A  | * | 4/1990  | Van Asten ................. 361/715 |
| 5,086,509 | A  | * | 2/1992  | Inubushi et al. ......... 455/575.8 |
| 5,729,291 | A  | * | 3/1998  | Tanaka et al. .............. 348/373 |
| 6,567,611 | B1 | * | 5/2003  | Soga ......................... 386/107 |
| 6,771,507 | B1 | * | 8/2004  | Belady et al. .............. 361/704 |
| 6,819,562 | B2 | * | 11/2004 | Boudreaux et al. ......... 361/690 |
| 7,123,481 | B2 | * | 10/2006 | Gotou et al. ................ 361/704 |

FOREIGN PATENT DOCUMENTS

JP       2004-253752 A    9/2004

* cited by examiner

*Primary Examiner*—Michael Datskovskiy
(74) *Attorney, Agent, or Firm*—Townsend and Townsend and Crew LLP

(57) ABSTRACT

In a portable electronic device having two circuit boards having a heat generating electronic device, a frame arranged at a position pinched between the circuit boards, a first heat radiating plate brought into contact with the frame and having a higher thermal conductivity than the frame, and a second heat radiating member transferring a heat between the first heat radiating member and two circuit boards, each of two circuit boards is fixed to the frame and two circuit boards are directly connected by a connector. Accordingly, it is possible to provide the portable electronic device which can improve a heat radiating efficiency and achieve a further thin structure.

12 Claims, 7 Drawing Sheets

PORTABLE ELECTRONIC APPARATUS

INCORPORATION BY REFERENCE

The present application claims priority from Japanese application JP2005-328247 filed on Nov. 14, 2005, the content of which is hereby incorporated by reference into this application.

BACKGROUND OF THE INVENTION

The present invention relates to a technique of a portable electronic apparatus loading an electronic device thereon.

As a background art of the present technical field, for example, there is JP-A-2004-253752 (patent document 1). In the present publication, there is described "an object is to intend to make an electronic apparatus compact" as a problem. Further, there is described "an electronic apparatus having an electronic device generating heat and an electronic device in which a used environmental temperature is lower than a temperature generated from the electronic device, comprising a support means supporting a casing of the electronic apparatus, and a heat conducting means arranged between the support means and the heat generating electronic device for conducting the heat by the heat generating electronic device" as a solving means thereof.

In the portable electronic apparatus having a circuit board mounting the electronic device thereon, it is required to let the heat in an inner portion loose into an external portion as efficiently as possible, for preventing a performance of a circuit part such as an IC or the like corresponding to the electronic device from being adversely affected by the generated heat. In the conventional portable electronic apparatus, in order to get the heat in the inner portion out, the structure is made such that a copper plate is closely contacted with and fixed to a metal frame forming a frame of the portable electronic apparatus, and the heat is let loose into the casing in the external portion via the copper plate. A description will be given of one example of an electronic apparatus using the conventional art with reference to FIG. 10.

FIG. 10 shows a cross sectional view of a conventional video camera. A metal frame 1 forming an entire frame and made of a metal is arranged in a center portion of the camera, and a copper heat radiating plate 6 for letting a heat in an internal portion loose into an external portion is bonded to one side of the metal frame 1 in accordance with a caulking so as to be fixed. A main substrate 3 having a circuit controlling a function of an entire of the camera is fixed to the metal frame 1 by a screw 3a. A heat radiating rubber 7b is arranged between a circuit part 3c such as an IC or the like mounted on the main substrate 3 and the heat radiating plate 6, and transfers the heat generated in the circuit part 3c to the heat radiating plate 6 via the heat radiating rubber 7b. A drive unit 4 reading and writing an information of an optical disc 9 is fixed to the metal frame 1 by a screw 5a. A drive substrate 2 on which a circuit part controlling the drive unit 4 is mounted is fixed to the drive unit 4 by a screw 2a. A heat radiating rubber 7a is arranged between a circuit part 2c such as an IC or the like mounted on the drive substrate 2 and the heat radiating plate 6, and transmits the heat generated in the circuit part 2c to the heat radiating plate 6 via the heat radiating rubber 7a. The main substrate 3 and the drive substrate 2 are electrically connected by a flexible element 8. The heat radiating plate 6 is brought into contact with an L case 10 corresponding to an outer shell part in a camera bottom surface portion X, and lets the heat in the circuit part 3c and the circuit part 2c loose into the external portion. A connector 2b mounted on the drive substrate 2 and a connector mounted on the flexible element 8 are connected, and the connector mounted on the flexible element 8 and a connector 3b mounted on the main substrate 3 are connected, whereby the drive substrate 2 and the main substrate 3 are electrically connected.

BRIEF SUMMARY OF THE INVENTION

In the conventional video camera using the optical disc, since the drive substrate 2 is fixed to the metal frame 1 via the drive unit 4 and a rubber damper 5 as shown in FIG. 10, an interval of a gap between the drive substrate 2 and the heat radiating plate 6 fixed to the metal frame 1 is not stabilized due to a deflection of the rubber damper 5, an assembling dispersion or the like, and a dispersion is generated. Accordingly, even if the heat radiating rubber 7a is arranged between the circuit part 2c such as the IC or the like mounted on the drive substrate 2 and the heat radiating plate 6, a contact pressure between the circuit part 2c and the heat radiating rubber 7a and between the heat radiating plate 6 and the heat radiating rubber 7a varies due to the dispersion of the interval of the gap. In the case that the interval of the gap is large, the contact pressure becomes low, so that there is a problem that it is impossible to securely transfer the heat of the drive substrate 2 to the heat radiating plate and an efficiency of the heat radiation is deteriorated.

Further, since two sets of connectors (the connector 2b and the connector 3b) are used for the connection between the drive substrate 2 and the main substrate 3 via the flexible element 8, and the connector 3b in the main substrate 3 side can not be mounted on the metal frame 1 side in view of an workability at a time of assembling, it is necessary to arrange the connector 3b in the opposite outer shell part side. Accordingly, it is necessary to secure a space for the connector in the outer shell part side, and there is a problem that a thin structure is obstructed.

An object of the present invention is to provide a portable electronic apparatus which improves a heat radiating efficiency of a drive substrate and intends to achieve a further thin structure, thereby improving a usability of the portable electronic apparatus.

In order to achieve the object mentioned above, there is provided a portable electronic apparatus comprising:

two circuit boards having heat generating electronic devices;

a frame arranged at a position pinched by the circuit boards; and a first heat radiating member brought into contact with the frame and having a higher heat conductivity than the frame, wherein the two circuit boards are respectively fixed to the frame and the two circuit boards are directly connected by a connector.

Accordingly, it is possible to provide a portable electronic apparatus which improves a heat radiating efficiency and intends to achieve a further thin structure.

Other objects, features and advantages of the invention will become apparent from the following description of the embodiments of the invention taken in conjunction with the accompanying drawings.

DESCRIPTION OF THE PREFERRED EMBODIMENTS

A description will be given below of an example of a video camera as a first embodiment in accordance with the present invention with reference to FIGS. 1 to 7.

Figure 1:
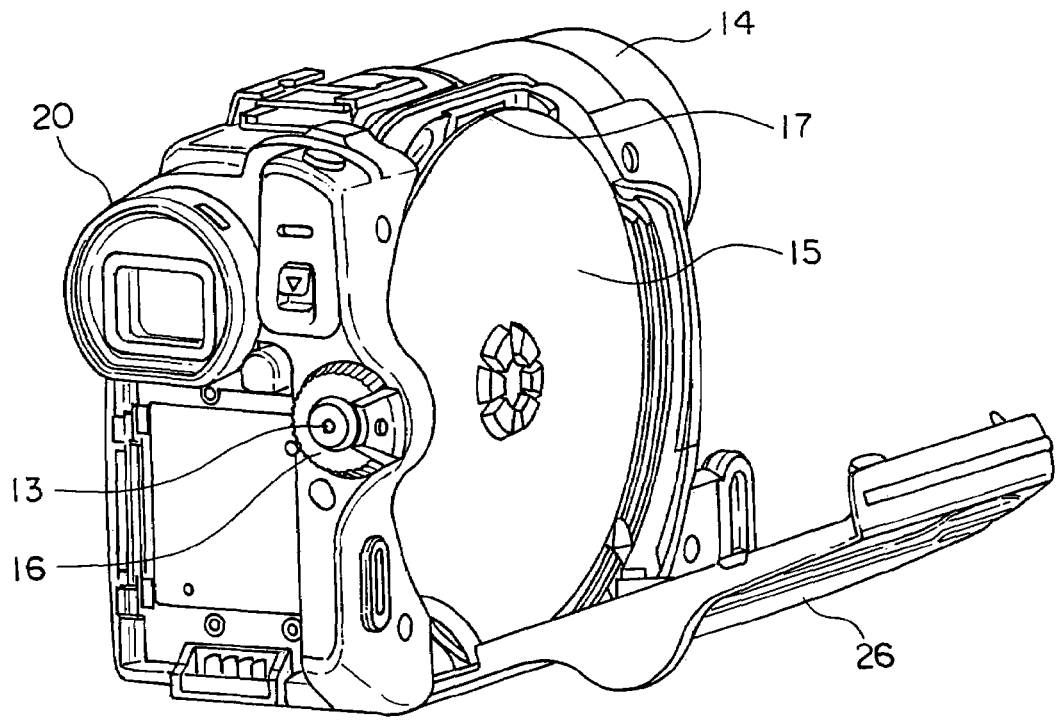
FIG. 1 is a rearward perspective view of a state in which a disc cover of a video camera in accordance with the present embodiment is open.
Figure 2:
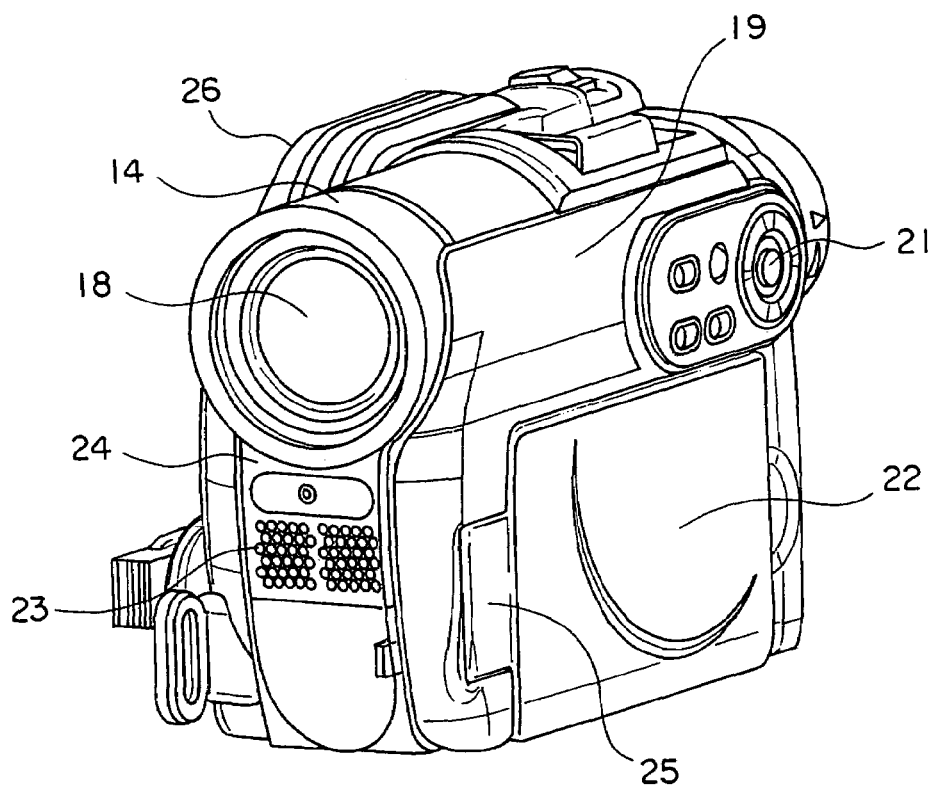
FIG. 2 is a frontward perspective view of the video camera in accordance with the present embodiment.

A description will be first given of a summary of the video camera using an optical disc in accordance with the present embodiment with reference to FIGS. 1 and 2. FIG. 1 is a rearward perspective view of a state in which a disc cover of the video camera in accordance with the present embodiment is open, and FIG. 2 is a frontward perspective view of the video camera in accordance with the present embodiment.

The video camera in accordance with the present embodiment is sectioned into a front side constituted by a lens portion 18, a microphone portion 23, a lens cover 14, a front case 24 and the like, a liquid crystal display side constituted by a liquid crystal display (LCD) panel portion 22, an LCD supporting point portion 25, a main body case 19 and the like, a grip side constituted by a disc cover 26, an R case 17 and the like, and a rear side constituted by an electric view finder (EVF) portion 20 and a battery (not shown).

A screen image and a voice are photographed and collected through the lens portion 18 and the microphone portion 23. The screen image and the like are displayed on the EVF portion 20 and the LCD portion 22 at a photographing time or a reproducing time. A mode switching knob 16 arranged in the rear side turns on and off a power source and switches a mode between a moving image mode and a static image mode. A picture recording button 13 corresponds to a button for starting and stopping the picture recording. The R case 17 in the grip side protects a drive unit (not shown) for recording a signal on an optical disc 15.

FIG. 2 shows a state in which the LCD portion 22 is closed while setting a display surface to an inner side. The LCD portion 22 can be opened and closed, and rotated by the LCD supporting point portion 25, and can adjust the display surface at an angle suitable for a used state. A reproducing operation button 21 mainly used at a reproducing time is arranged in a surface which is adjacent to the closed LCD portion 22.

Figure 3:
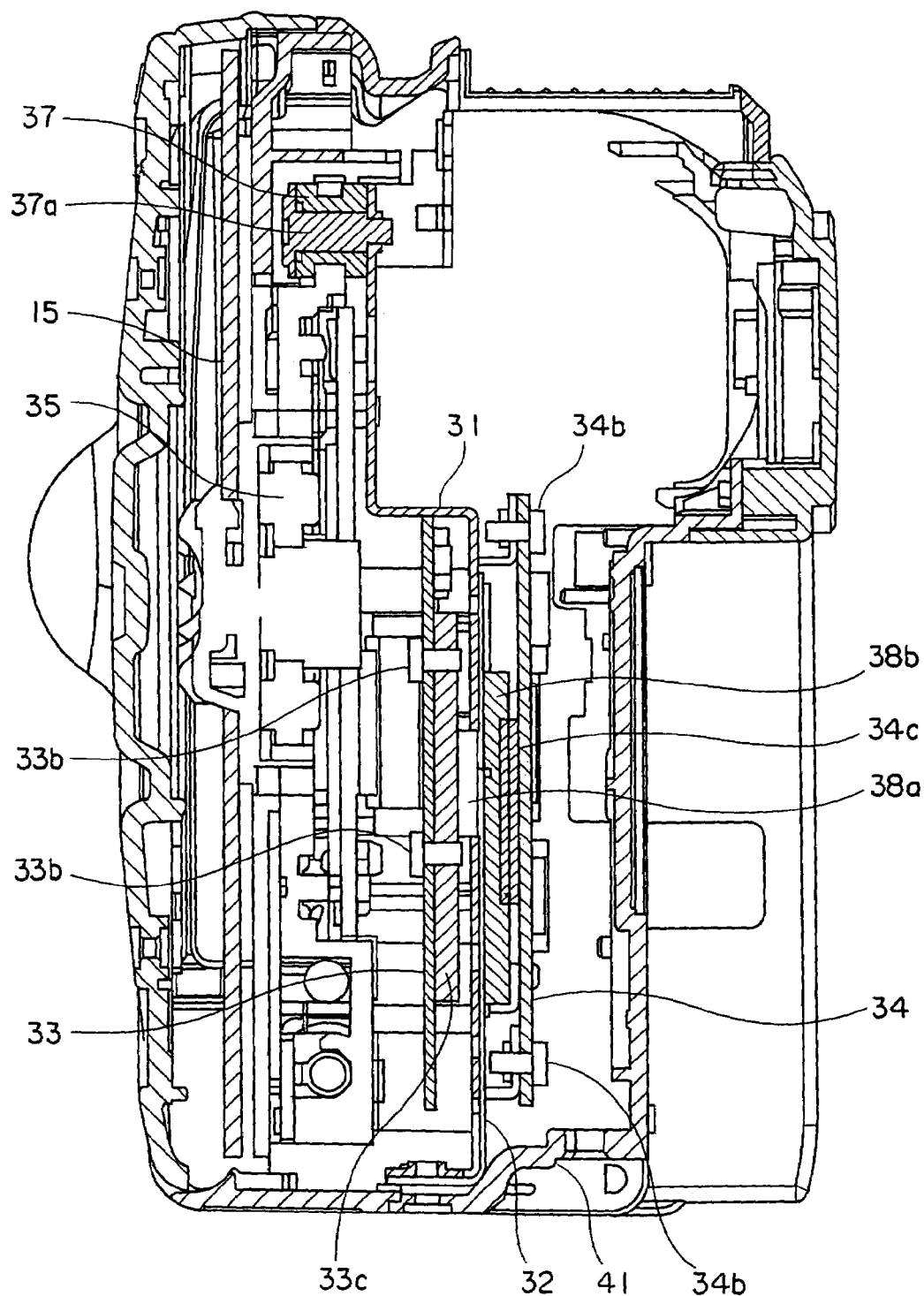
FIG. 3 is a cross sectional view of the video camera in accordance with the present embodiment.
Figure 4:
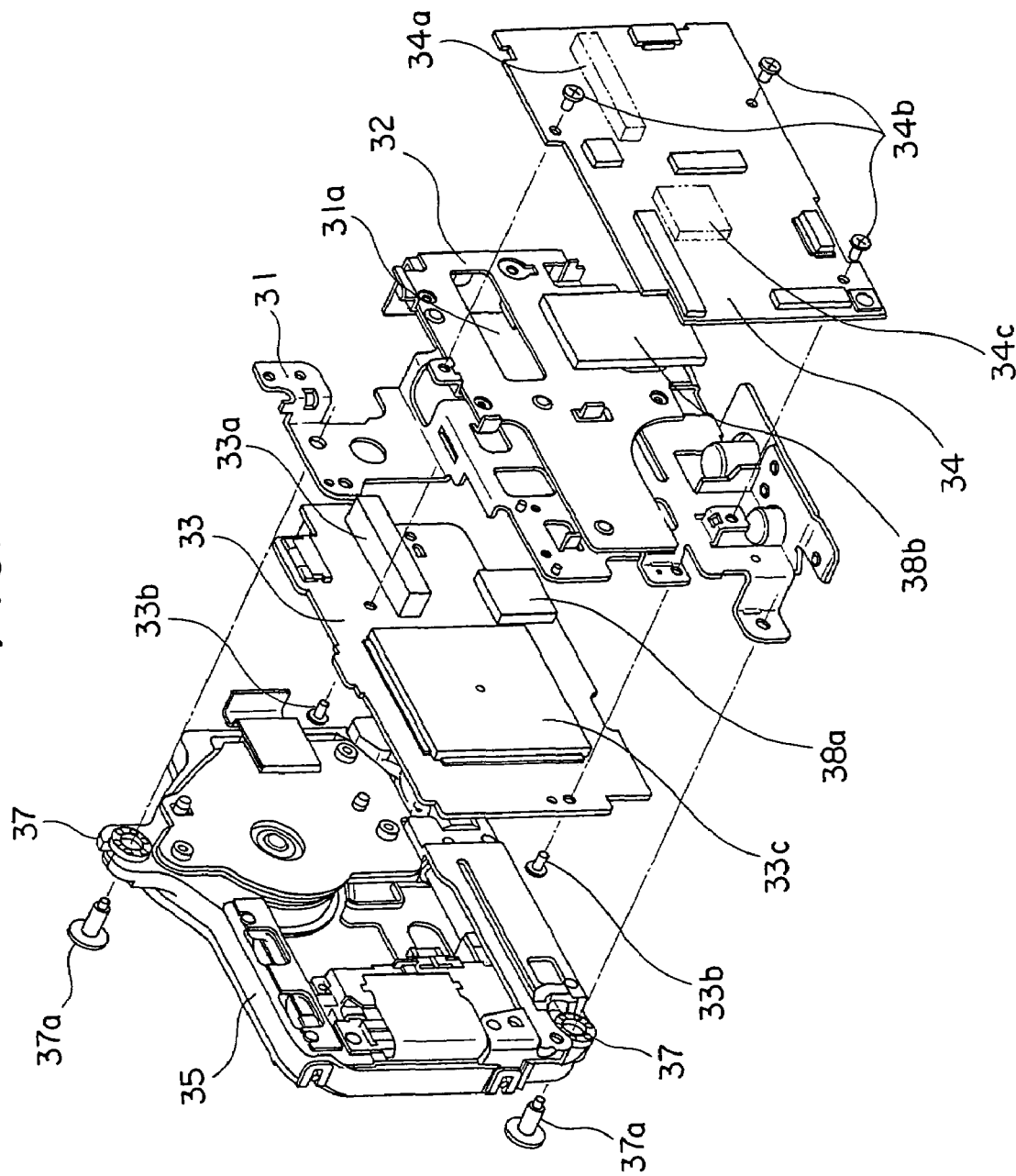
FIG. 4 is an exploded view of the video camera in accordance with the present embodiment.

In this case, a description will be given of an internal fixing method and an internal structure of the video camera in accordance with the present embodiment with reference to FIGS. 3 and 4. FIG. 3 is a cross sectional view of the video camera in accordance with the present embodiment, and FIG. 4 is an exploded view of the video camera in accordance with the present embodiment.

First, a description will be given of the internal fixing method with reference to FIG. 4. A drive unit 35 is fixed to a metal frame 31 via a rubber damper 37 by a screw 37a, a main substrate 34 is further fixed to the metal frame 31 by a screw 34b, and a drive substrate 33 is fixed to the metal frame 31 by a screw 33b. The main substrate 34 and the drive substrate 33 are electrically connected through the metal frame 31 and an opening portion 31a of a heat radiating plate 32 by a connector 34a mounted on the main substrate 34 and a connector 33a mounted on the drive substrate 33. A heat radiating rubber A 38a is arranged between an IC 33c mounted on the drive substrate 33 and the heat radiating plate 32. A heat radiating rubber B 38b is arranged between an IC 34c mounted on the main substrate 34 and the heat radiating plate 32.

Next, a description will be given of the internal structure with reference to FIG. 3. The metal frame 31 forming an entire frame and made of a metal is arranged in a center portion of the camera, and the copper heat radiating plate 32 for letting an internal heat loose into an external portion is bonded to one side of the metal frame 31 in accordance with a caulking so as to be fixed. The main substrate 34 having a circuit controlling an entire function of the present camera is fixed to the metal frame 31 by the screw 34b, and the heat radiating rubber B 38b is arranged between the IC 34c mounted on the main substrate 34 and the heat radiating plate 32. Further, the drive substrate 33 on which a circuit part controlling the drive unit 35 is mounted is fixed to the metal frame 31 by the screw 33b, and the heat radiating rubber A 38a is arranged between the IC 33c mounted on the drive substrate 33 and the heat radiating plate 32. The heat radiating plate 32 is brought into contact with an L case 41 corresponding to an outer shell part in a camera bottom surface portion, and lets the heat in the IC 33c and the IC 34c loose into the external portion. The drive unit 35 reading and writing the information of the optical disc 15 is fixed to the metal frame 31 via the rubber damper 37 by the screw 37a.

As mentioned above, the dispersion of the gap between the IC 33c mounted on the drive substrate 33 and the heat radiating plate 32 becomes small by attaching the drive substrate 33 to the metal frame 31 by the screw 33b, and it is possible to improve a heat radiating efficiency by stabilizing the contact pressure between the IC 33a and the heat radiating rubber A 38a and between the heat radiating plate 32 and the heat radiating rubber A 38a high. Further, it is not necessary to secure the space for the connector in the outer shell part side by connecting by a set of connectors while utilizing the space between the drive substrate 33 and the main substrate 34, and it is possible to contribute to the thin structure of the video camera. Further, since it is possible to reduce the number of the connectors connecting between the drive substrate 33 and the main substrate 34, it is possible to reduce an electric loss.

Figure 5:
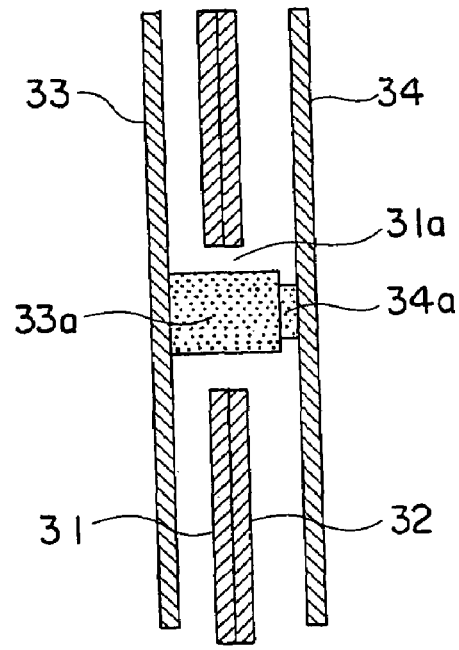
FIG. 5 is a schematic view of a connector portion between a drive substrate and a main substrate of the video camera in accordance with the present embodiment.

FIG. 5 shows a schematic view of the connector portion between the drive substrate and the main substrate in accordance with the present embodiment. The main substrate 34 and the drive substrate 33 are electrically connected through the metal frame 31 and the opening portion 31*a* of the heat radiating plate 32 by the connector 34*a* mounted on the main substrate 34 and the connector 33*a* mounted on the drive substrate 33. In accordance with the structure, since the connector is arranged in the overlapping portion between the drive substrate and the main substrate and the connector is arranged by utilizing the space pinched by two circuit boards, it is not necessary to enlarge two drive substrates and the main substrate, and the thin structure can be achieved without enlarging the outer shape such as the height of the portable electronic apparatus and the like.

Figure 6:
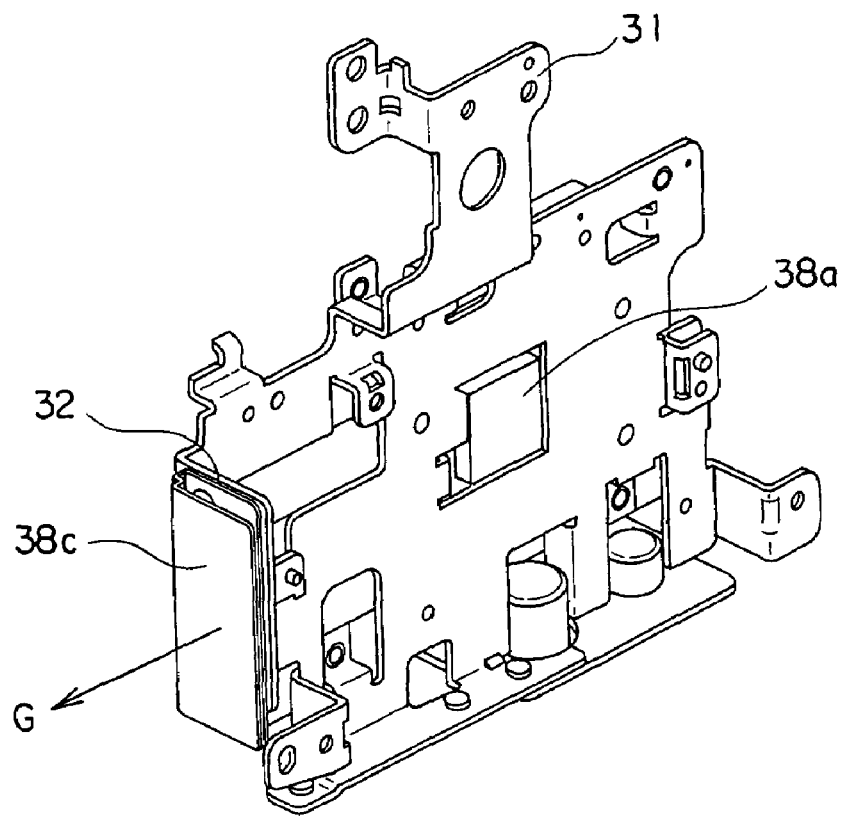
FIG. 6 is a perspective view in the case that a metal frame and a heat transfer member of the video camera in accordance with the present embodiment are integrally formed.
Figure 7A:
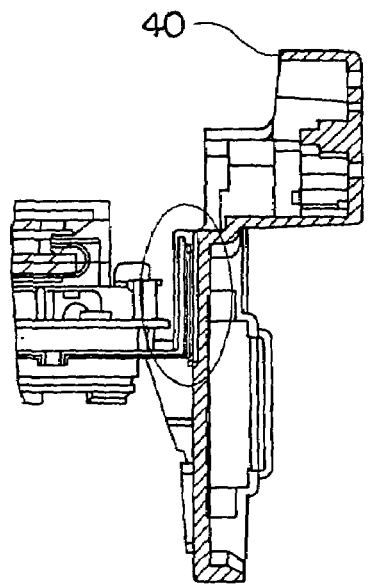
FIG. 7 is a cross sectional view around a rear case of the video camera in accordance with the present embodiment.
Figure 7B:
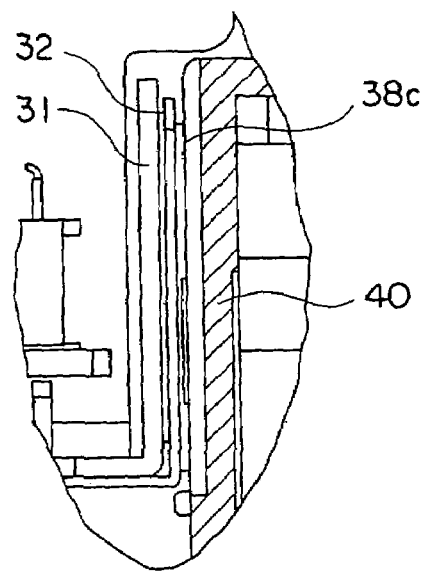

A description will be further given of a path through which the heat of the IC 33*c* on the drive substrate 33 is radiated to the external portion via the heat radiating plate 32 with reference to FIGS. 6 and 7. FIG. 6 is a perspective view in the case that the metal frame and the heat transfer member of the video camera in accordance with the present embodiment are integrally formed, FIG. 7A is a cross sectional view around the rear case of the video camera in accordance with the present embodiment, and FIG. 7B is an enlarged view of FIG. 7A.

In order to let the heat generated from the drive substrate 33 loose into the external portion, the heat radiating rubber A 38*a* made of an elastic material is stuck to the portion between the circuit part of the IC 33*c* mounted on the drive substrate 33 and the heat radiating plate 32, and the heat which the heat radiating rubber A 38*a* absorbs from the IC 33*c* is transferred to the outer shell part via the copper heat radiating plate 32 caulked in the metal frame 31. On the other hand, the heat radiating rubber C 38*c* is stuck to the end portion of the heat radiating plate 32 in the rear direction of the video camera, and the heat radiating rubber C 38*c* is brought into contact with the rear case 40 so as to radiate the heat in a direction G via the rear case 40.

In this case, a description of the heat transfer of the IC 34*c* mounted on the main substrate 34 will be omitted here.

Figure 8:
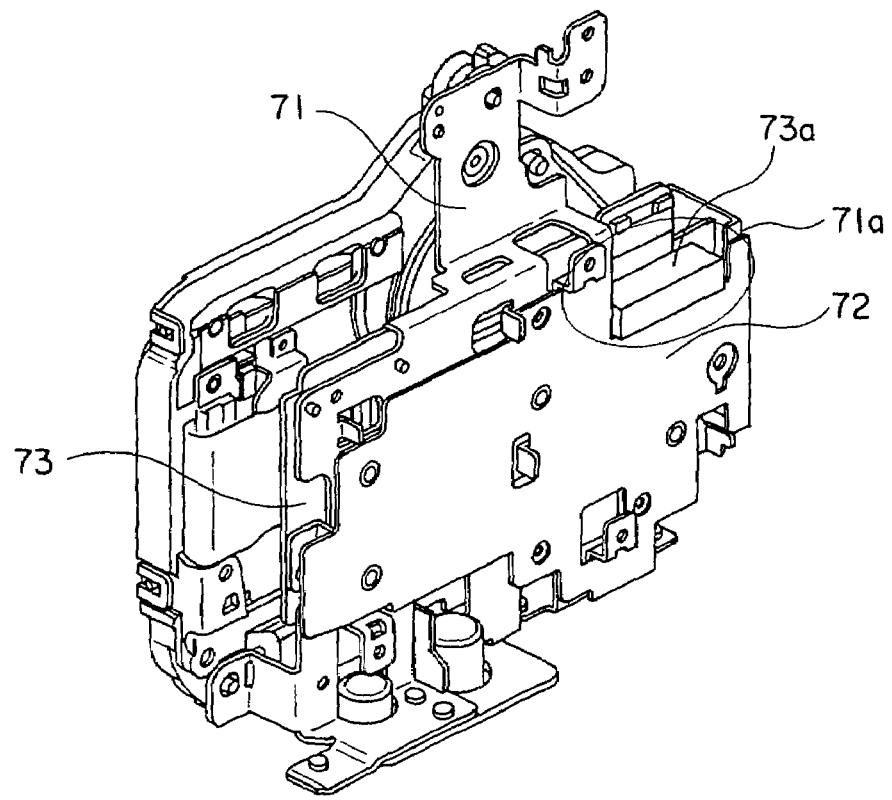
FIG. 8 is an internal perspective view of a video camera in accordance with a second embodiment of the present embodiment.

Next, a description will be given of a second embodiment of a video camera corresponding to the other embodiment in accordance with the present invention. In the embodiment 2, a notch portion is provided in place of the opening portion 31*a* in the embodiment 1. FIG. 8 shows an internal perspective view of the video camera in accordance with the present embodiment.

A main substrate (not shown) is connected to a metal frame 71 and a notch portion 71*a* of a heat radiating plate 72 through a connector 73*a* of a drive substrate 73. In this case, since a working process is reduced in the metal frame 71 and the heat radiating plate 72 in comparison with the case that the opening portion is provided, it is possible to reduce a cost of the metal frame 71 and the heat radiating plate 72. Further, if a position of the connector 73*a* is arranged near an end surface of the drive substrate 73, the notch portion 71*a* becomes smaller, and it is possible to reduce a deterioration of a strength in the metal frame 71.

Figure 9:
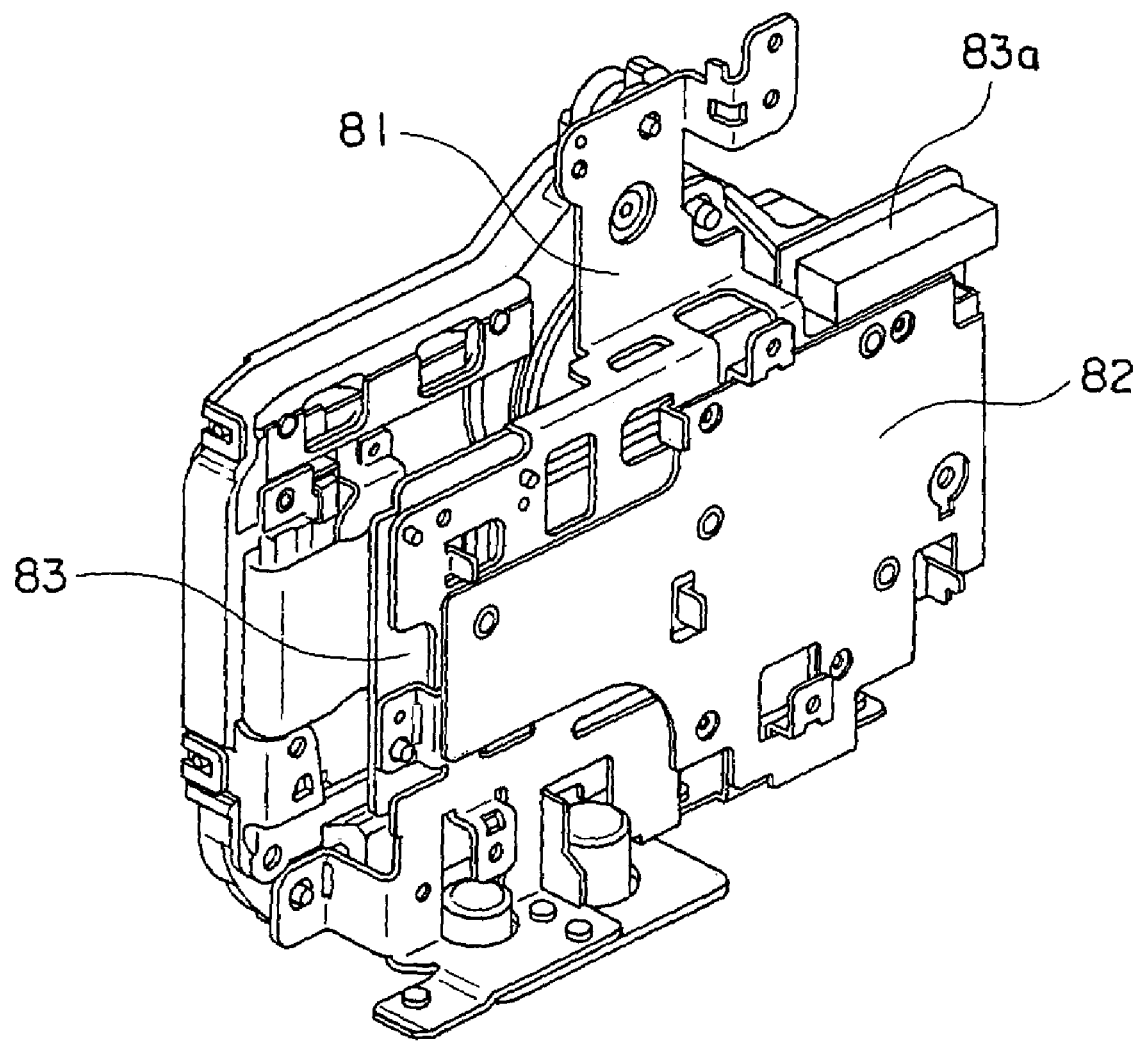
FIG. 9 is an internal perspective view of a video camera in accordance with a third embodiment of the present embodiment.
Figure 10:
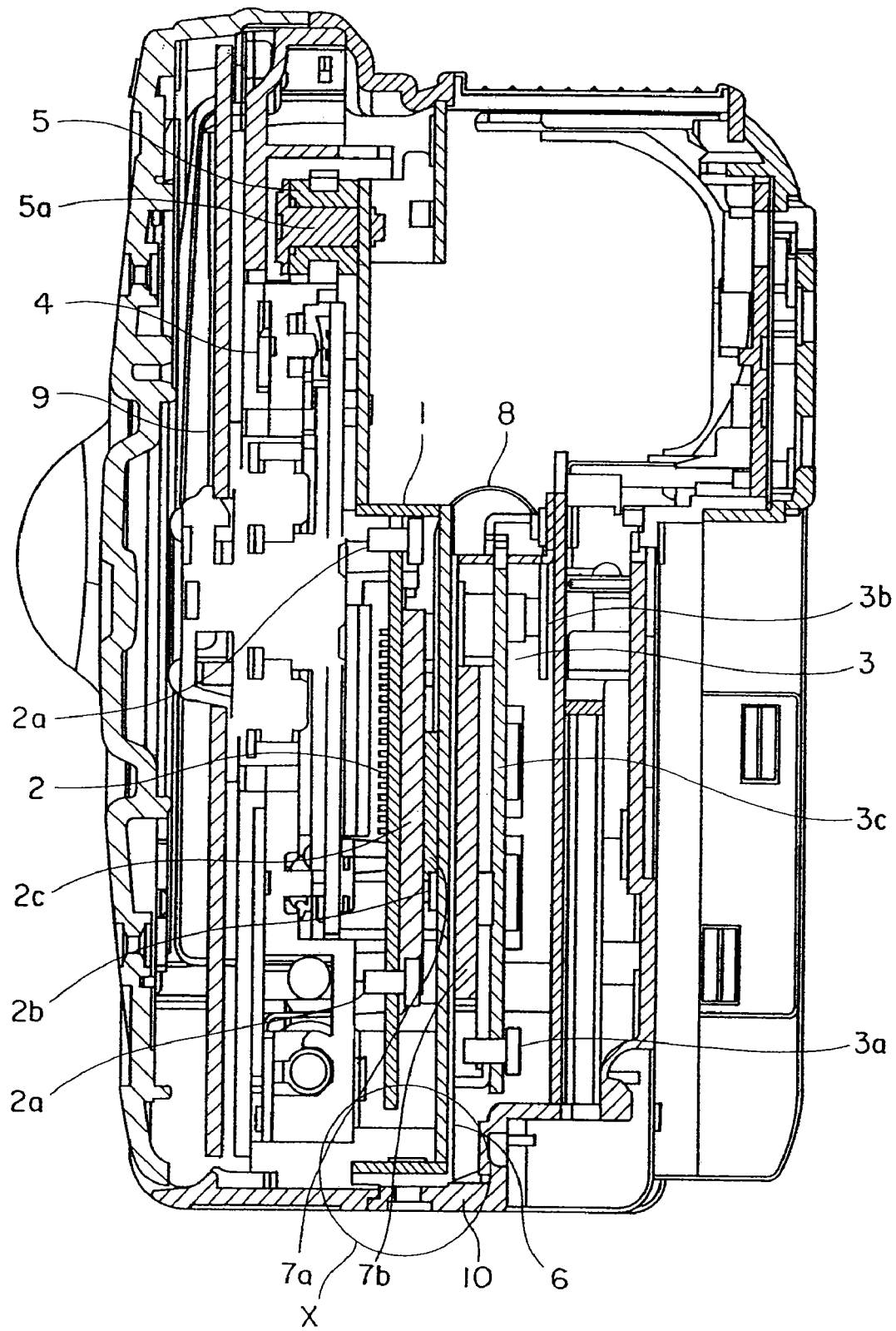
FIG. 10 is a cross sectional view of a conventional video camera.

Next, a description will be given of a third embodiment of a video camera corresponding to the other embodiment in accordance with the present invention. In the embodiment 3, the main substrate and the drive substrate are directly connected by the connector without forming the opening portion or the notch portion. FIG. 9 shows an internal perspective view of the video camera in accordance with the present embodiment.

In FIG. 9, a main substrate (not shown) is connected to an outer side of a metal frame 81 and a heat radiating plate 82 through a connector 83*a* of a drive substrate 83. In this case, it is not necessary to form the opening portion or the notch portion in the metal frame 81 and the heat radiating plate 82, and it is possible to further improve a strength of the metal frame 81 and the heat radiating plate 82. Further, a working process is reduced and it is possible to further reduce a cost of the metal frame 81 and the heat radiating plate 82.

As mentioned above, in accordance with the present invention, it is possible to provide the portable electronic apparatus which can improve the heat radiating efficiency and achieve a further thin structure.

It should be further understood by those skilled in the art that although foregoing description has been made on embodiments of the invention, the invention is not limited thereto and various changes and modifications may be made without departing from the spirit of the invention and the scope of the appended claims.

The invention claimed is:

1. A portable electronic device comprising:
   a first circuit board provided with a heat generating electronic device and a circuit part controlling a recording medium drive apparatus;
   a second circuit board provided with a heat generating electronic device;
   a support member supporting said first circuit board and said second circuit board; and
   a heat radiating plate transferring the heat from said heat generating electronic devices,
   wherein said first circuit board, said support member, said heat radiating plate and said second circuit board are arranged in this order, an opening portion is provided in said support member, and said first circuit board and said second circuit board are connected through said opening portion.

2. A portable electronic apparatus as claimed in claim 1, wherein said first circuit board and said second circuit board are brought into contact with said heat radiating plate via a rubber.

3. A portable electronic device comprising:
   a first circuit board provided with a heat generating electronic device and controlling a recording medium drive apparatus;
   a second circuit board provided with a heat generating electronic device;
   a support member supporting said first circuit board and said second circuit board; and
   a heat radiating plate transferring the heat from said heat generating electronic devices,
   wherein said first circuit board, said support member, said heat radiating plate and said second circuit board are arranged in this order, a notch portion is provided in said support member, and said first circuit board and said second circuit board are connected through said notch portion.

4. A portable electronic apparatus as claimed in claim 3, wherein said first circuit board and said second circuit board are brought into contact with said heat radiating plate via a rubber.

5. A portable electronic device comprising:
   first and second circuit boards each having a heat generating electronic device;
   a frame arranged at a position pinched between said first and second circuit boards;
   a first heat radiating plate brought into contact with said frame and having a higher thermal conductivity than said frame,
   wherein each of said first and second circuit boards is fixed to said frame and said first and second circuit boards are directly connected by a connector, wherein a second heat transfer member is disposed between said first heat radiating member and said first circuit board and between said first heat radiating member and said second circuit board.

6. A portable electronic apparatus as claimed in claim 5, wherein an opening portion is provided in said frame and said first heat radiating member, and said two circuit boards are directly connected by the connector through said opening.

7. A portable electronic apparatus as claimed in claim 5, wherein said two circuit boards are constituted by a drive substrate on which a circuit part controlling a drive unit of an optical disc is mounted, and a main substrate having a circuit controlling an entire function of the apparatus.

8. A portable electronic apparatus as claimed in claim 6, wherein said two circuit boards are constituted by a drive substrate on which a circuit part controlling a drive unit of an optical disc is mounted, and a main substrate having a circuit controlling an entire function of the apparatus.

9. A portable electronic apparatus as claimed in claim 5, wherein the portable electronic apparatus has a function of a video camera provided with at least a photographing portion and a display portion.

10. A portable electronic apparatus as claimed in claim 6, wherein the portable electronic apparatus has a function of a video camera provided with at least a photographing portion and a display portion.

11. A portable electronic apparatus as claimed in claim 7, wherein the portable electronic apparatus has a function of a video camera provided with at least a photographing portion and a display portion.

12. A portable electronic apparatus as claimed in claim 8, wherein the portable electronic apparatus has a function of a video camera provided with at least a photographing portion and a display portion.

* * * * *